United States Patent [19]

Dietl et al.

[11] Patent Number: 4,515,600
[45] Date of Patent: May 7, 1985

[54] PROCESS FOR THE REMOVAL OF THE SLAG PORTION FROM MOLTEN MIXTURES OF SLAG AND SILICON USING A SEMIPERMEABLE SEPARATING WALL

[75] Inventors: Josef Dietl, Neuötting; Jörg Kotilge, Burghausen, both of Fed. Rep. of Germany

[73] Assignee: Heliotronic Forschungs-und Entwicklungsgesellschaft für Solarzellen-Grundstoffe m.b.H., Burghausen, Fed. Rep. of Germany

[21] Appl. No.: 470,980

[22] Filed: Mar. 1, 1983

[30] Foreign Application Priority Data

Mar. 11, 1982 [DE] Fed. Rep. of Germany ....... 3208877

[51] Int. Cl.$^3$ .............................................. C01B 33/02
[52] U.S. Cl. .................................... 23/293 R; 75/24; 210/773; 210/774; 423/348
[58] Field of Search ..................... 210/510.1, 773, 774, 210/497.1; 23/293 R, 295 R; 75/24; 423/348, 349, 350; 156/DIG. 64

[56] References Cited

U.S. PATENT DOCUMENTS

| | | | |
|---|---|---|---|
| 2,355,980 | 8/1944 | Yerkes . | |
| 4,113,241 | 9/1978 | Dore | 210/510.1 X |
| 4,388,286 | 6/1983 | Kapur et al. | 423/348 |
| 4,394,271 | 7/1983 | Groteke | 210/773 |
| 4,398,931 | 8/1983 | Shevlin | 210/497.1 X |
| 4,457,903 | 7/1984 | Dietl et al. | 423/350 |

Primary Examiner—Richard V. Fisher
Assistant Examiner—W. Gary Jones
Attorney, Agent, or Firm—Collard, Roe & Galgano

[57] ABSTRACT

The slag portion can easily be removed from molten mixtures of slag and silicon by subjecting such mixtures to a hydrostatic pressure difference with respect to a space separated from them by one or more separating walls of graphite or silicon carbide, preferably provided with circular to slot-shaped apertures. Such separating walls are permeable to both the slag and silicon when present alone, but permeable only to the slag when a molten mixture of slag and silicon is present.

5 Claims, 2 Drawing Figures

PROCESS FOR THE REMOVAL OF THE SLAG PORTION FROM MOLTEN MIXTURES OF SLAG AND SILICON USING A SEMIPERMEABLE SEPARATING WALL

The present invention relates to a process for the removal of the slag portion from molten mixtures of slag and silicon.

In the field of photovoltaic generation of power, silicon-based solar cells are at present far too expensive for terrestrial use on a wide scale. This is chiefly due to the costly manufacture of elemental silicon by thermal decomposition of gaseous silanes on heated carrier bodies. In order to reduce costs, less expensive processes for manufacturing elemental silicon are therefore gaining increasing importance. Such processes are, e.g., the aluminothermic reduction of quartz in a slag system serving as the reaction medium, for the purification of elemental silicon by slag extraction. A disadvantage of these processes, however, lies in the fact that the silicon is usually mixed with the slag in the form of melt droplets of various sizes. Because of the low density differences, the separation of slag and silicon, which is imperative for subsequent treatment, progresses only slowly, and thus the silicon can be separated and worked up only in an extremely time-consuming manner.

The object of the invention is therefore to provide a process which permits the rapid removal of the slag portion from molten mixtures of silicon and slag.

This object is achieved according to the invention by a process which is characterized in that such a molten mixture is subjected to a hydrostatic pressure difference with respect to a space separated from it by one or more semipermeable separating walls of graphite or silicon carbide provided with polygonal, or circular to slot-shaped apertures of up to 10 mm inside width.

Surprisingly, it was in fact found that, as regards molten mixtures of silicon and slag, such separating walls are permeable only to the slag, while the silicon is held back. On the other hand, in the absence of slag, the separating walls are easily wetted and unimpededly passed through by the silicon.

Such behavior can be identified in the case of many of the slag materials customarily used in the manufacture and purification of silicon, for example as protective melts, as a reaction medium, or as an extraction medium. Thus, according to the process of the invention, slags based on the silicates and fluorides of the alkaline earth metals; and magnesium, calcium, strontium and barium, alone or in admixture, may be separated particularly successfully from silicon. This also applies when the slag contains, in dissolved form, further components, such as, for instance, aluminum oxide formed during the aluminothermic reduction of quartz, or impurities extracted from silicon. The same behavior is also exhibited by sulphidic slags, especially aluminum sulphide in molten mixtures with Si—Al mixed melts.

The operating temperature is advantageously so selected, at least prior to and during the separating process, that solidification of slag components or silicon out of the molten mixture, and the consequent formation of undesirable deposits in the separating wall apertures, is prevented. Accordingly, the lower limit of the suitable temperature range lies in the region of the melting point of silicon, that is, at about 1420° C. Ordinarily, however, a slag will be used, the melting point of which lies above that of silicon, and therefore the operating temperature selected should be correspondingly higher. After the phase separation has finished, by reducing the operating temperature to below the melting point of the slag and above the melting point of silicon, the slag may, in fact, be made to freeze out in an especially favorable manner, while the still liquid silicon phase can be easily removed by being poured or siphoned off. The upper limit of the operating temperature is basically determined only by the thermal stability and volatility of the slag and the material of which the melt container and the separating walls are made. For example, when using a slag comprising 85% by weight of calcium silicate and 15% by weight of calcium fluoride in a container of graphite having a graphite separating wall, an operating temperature range of from 1560° to 1600° C. has proved favorable.

The apertures in the separating walls of graphite or silicon carbide permit only slag, and not silicon, to pass through when molten mixtures of silicon and slag are involved. These apertures may have various geometric shapes; for example, circular, oval, elliptical, and also polygonal (including triangular), and especially slot-shaped, cross-sections may be considered. Regardless of their longitudinal extent, for instance in the case of slot-shaped cross-sections, these apertures remain impermeable to silicon if their inside width does not exceed 10 mm. The range from 2 to 8 mm for the inside width has proved especially advantageous. In principle, however, because of the high penetration power of the alkaline earth metal silicate/fluoride mixed slags in particular, the inside width of the apertures can be reduced to approximately 100 μm, although then, because of the lower penetration speed of the slag, the phase separation is noticeably slowed. The thickness of the separating walls remains, for example, in the customary range of from 10 to 30 mm, substantially without effect on the semipermeable action, and can thus be matched without difficulty to the requirements of stability.

The space or chamber partitioned off from the molten mixture by the separating wall, or several separating walls, and the separating walls themselves, may be of any design, depending on the manner in which the hydrostatic pressure difference with respect to the molten mixture is produced. The following embodiments serve therefore merely to illustrate the concept of the invention and are not to be regarded as limiting.

For example, in a container, for instance a graphite crucible, a space or chamber may be partitioned off by a graphite separating wall provided with apertures; the chamber may contain a lateral drain or a bottom drain. The chamber may be formed, for example, by a separating wall inserted between two lateral walls, or alternatively, for instance, by a cylindrical member positioned above the drain, or by a separating wall covering the drain. Expediently, with such arrangements a discharge regulator is provided which, by controlling the amount of slag draining off, prevents too rapid a drop in the level of slag, with the consequent risk of premature discharge of silicon. A suitable arrangement for this purpose is, for example, a slide valve, expediently arranged on the outside of the container, which can close the drain after all the slag has been discharged, so that only silicon remains in the container. Likewise, a stopper rod, for example, immersed in the slag, may be used, which is suitable for closing the drain and also for metering the amount of slag being discharged.

If, in such arrangements, a molten mixture of silicon and slag is introduced into the part of the container without a drain, on account of the hydrostatic pressure difference the slag will pass through the separating wall and flow out through the drain, while the silicon is retained in the container. When the entire amount of slag has flowed away, and the silicon starts to pass through the separating wall and to flow away (this can be detected with the naked eye, for example, by the difference in color between the silicon melt and the slag melt), the virtually slag-free silicon can, by closing the drain, be held back in the container and subjected to further treatment.

Other objects and features of the present invention will become apparent from the following detailed description considered in connection with the accompanying drawing, which discloses one embodiment of the invention. It is to be understood that the drawing is to be used for the purposes of illustration only, and not as a definition of the limits of the invention.

In the drawing, wherein similar reference characters denote similar elements throughout the several views.

Figure 1:
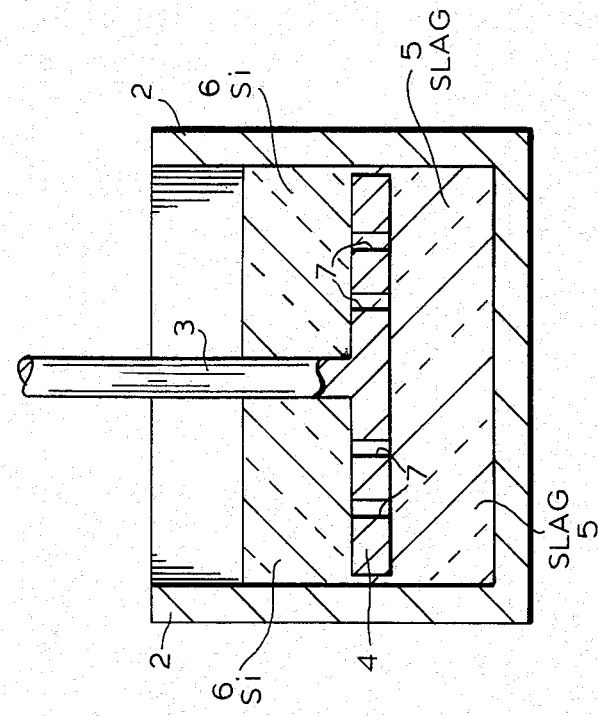
FIG. 1 is a schematically illustrated, cross-sectional view of an apparatus for performing the inventive process, shown in a position prior to Si-slag separation.
Figure 2:
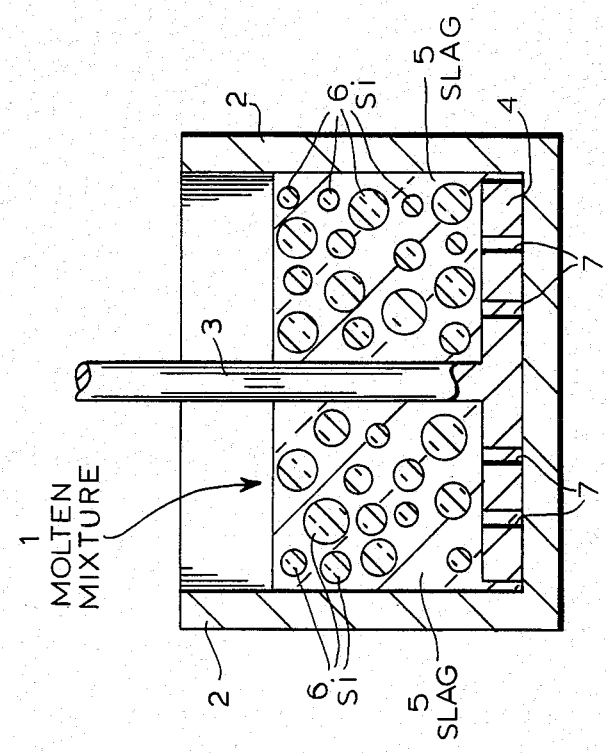
FIG. 2 is a schematically illustrated cross-sectional view of an apparatus for performing the inventive process, similar to that of FIG. 1, but showing the apparatus in a position following Si-slag separation.

Referring now in detail to the drawing, in this illustrated embodiment, the separating walls are mounted in suitable containers in such a manner that they can be moved. More particularly, as shown in FIG. 1, the molten mixture 1 is located in a container 2, with a separating wall 4 initially positioned in the bottom of the container covering its floor, the separating wall 4 being movable in an upward direction, for example, by means of a graphite rod 3. If the separating wall 4 is thereafter moved upwards, then, as shown in FIG. 2, the slag portion 5 of the molten mixture will pass through the apertures 7 of the separating wall 4 and remain beneath it, while the silicon 6 collects above it. When phase separation has finished, by reducing the operating temperature, for example, the slag can be solidified, so that only the silicon phase located above the separating wall remains liquid and can, for example, be removed by being poured, ladled or siphoned off. According to the same principle, an arrangement with a horizontally movable separating wall covering a lateral wall may also be used for separating the phases. As a limiting case of a movable separating wall, for example, use may be made in a cylindrical container of a separating wall rotating about the cylinder axis, and approximately the same size as the area between the cylinder axis and the side wall. The silicon in the molten mixture then collects in front of the rotating separating wall and can be poured or siphoned off once the rotating separating wall has been stopped and removed and the slag has been solidified.

A further possibility consists of immersing, in the molten mixture, hollow displacement members constructed from the separating walls according to the invention. The slag then penetrates into the displacement members and can be removed with them, for example, after being solidified, leaving behind molten silicon for further processing.

There is, in addition, the possibility of ladling the silicon out of the molten mixture with the help of scooping devices containing separating walls according to the invention. The use of double-walled scooping devices, for example ladles, has proved particularly successful; in these devices, the inner wall comprises a separating wall according to the invention while the outer wall, separated therefrom by a gap into which the slag can flow, is impermeable both to the slag and to the silicon. During the scooping operation, the silicon then remains within the inner space of the ladle, while the gap between the outer wall and separating wall fills with slag and thus prevents the silicon from flowing out of the inner space. When the slag portion has been solidified, the silicon, which has remained molten, can then be poured virtually free from slag out of the inner space of the ladle.

The embodiments of the process according to the invention described herein, as well as other conceivable arrangements, thus offer a simple and rapid method of removing the slag portion from molten mixtures of slag and silicon.

EXAMPLE

A molten mixture, of equal parts of silicon and slag having a composition of $CaO.SiO_2$ was maintained, at a temperature of 1580° C., in an arrangement corresponding to FIG. 1, consisting of a melt crucible 2 of fine-grain graphite and a 10 mm thick, upwardly movable, separating wall 4 of fine-grain graphite covering the floor of the crucible, the wall 4 being provided with 6 or 8 apertures 7 of 5 mm diameter in the form of two concentric circles. The separating wall 4, secured to a graphite rod 3, was then moved upwards, at a speed of 10 mm/sec, until the entire amount of slag 5 had passed through it and only silicon 6 remained above it. The temperature was then reduced to 1450° C. and the slag 5 was solidified. The molten silicon 6 above the separating wall 4 was removed by being poured off. The temperature of the melt crucible 2 was then increased again to above the melting point of the remaining slag 5, which was then poured out of the crucible 2. The crucible 2 was then ready for the phase separation of a further batch of the molten mixture. The process was carried out in a melt installation filled with nitrogen.

While only one embodiment of the present invention has been shown and described, it is obvious that many changes and modifications may be made thereunto without departing from the spirit and scope of the invention.

What is claimed is:

1. A process for the removal of the slag portion from a molten mixture of silicon and slag, comprising the steps of:
    subjecting a molten mixture of silicon and slag to a hydrostatic pressure difference with respect to a space separated from it by at least one semipermeable separating wall, provided with apertures of from about 0.1 to 10 mm inside width, so as to make said separating wall permeable to both said slag and to said silicon when present alone, but permeable only to said slag when a molten mixture of said slag and silicon is present, and permitting the slag to be drawn through said apertures of said separating wall, and to collect in said space, with said silicon being held back.

2. The process of claim 1, wherein said slag comprises a member selected from the group consisting of silicates of the alkaline earth metals magnesium, calcium, strontium and barium, the fluorides of the alkaline earth metals magnesium, calcium, strontium and barium, and a combination thereof.

3. The process of claim 1, wherein said separating wall is made of graphite.

4. The process of claim 1, wherein said separating wall is made of silicon carbide.

5. The process of claim 1, wherein said molten mixture is received in a crucible and wherein said separating wall is moveably mounted in said crucible.

* * * * *